(12) United States Patent
Kojima (10) Patent No.: US 8,405,545 B2
(45) Date of Patent: Mar. 26, 2013

(54) RADAR DEVICE AND RADAR DEVICE COMPONENT

(75) Inventor: Tatsuya Kojima, Nishinomiya (JP)

(73) Assignee: Furuno Electric Company, Limited, Nishinomiya, Hyogo (JP)

( * ) Notice: Subject to any disclaimer, the term of this patent is extended or adjusted under 35 U.S.C. 154(b) by 517 days.

(21) Appl. No.: 12/572,624

(22) Filed: Oct. 2, 2009

(65) Prior Publication Data

US 2010/0085244 A1 Apr. 8, 2010

(30) Foreign Application Priority Data

Oct. 3, 2008 (JP) ................................. 2008-259040

(51) Int. Cl.
*G01S 7/298* (2006.01)
*H04N 7/01* (2006.01)
*G01S 7/00* (2006.01)
*H04N 7/00* (2006.01)

(52) U.S. Cl. ........ 342/185; 342/175; 342/176; 348/441; 348/442

(58) Field of Classification Search .................. 342/175, 342/176, 179, 185, 195; 348/441, 442
See application file for complete search history.

(56) References Cited

U.S. PATENT DOCUMENTS

| | | | | |
|---|---|---|---|---|
| 3,569,616 A | * | 3/1971 | Baker | 348/442 |
| 3,633,173 A | * | 1/1972 | Edge | 342/185 |
| 3,684,915 A | * | 8/1972 | Gangawere | 342/185 |
| 3,765,018 A | * | 10/1973 | Heard et al. | 342/185 |
| 3,797,014 A | * | 3/1974 | Tompkins et al. | 342/185 |
| 3,810,174 A | * | 5/1974 | Heard et al. | 342/185 |
| 3,827,027 A | * | 7/1974 | Towson et al. | 342/185 |
| 3,838,420 A | * | 9/1974 | Heard et al. | 342/185 |
| 3,904,817 A | * | 9/1975 | Hoffman et al. | 348/442 |
| 3,964,064 A | * | 6/1976 | Brandao et al. | 342/185 |
| 4,002,827 A | * | 1/1977 | Nevin et al. | 342/185 |
| 4,065,770 A | * | 12/1977 | Berry | 342/185 |
| 4,106,021 A | * | 8/1978 | Katagi | 342/185 |
| 4,128,838 A | * | 12/1978 | Brands et al. | 342/185 |
| 4,149,252 A | * | 4/1979 | Miller, Jr. | 348/442 |
| 4,208,721 A | * | 6/1980 | Eisenberg | 342/185 |
| 4,214,269 A | * | 7/1980 | Parker et al. | 348/442 |
| 4,220,969 A | * | 9/1980 | Nitadori | 342/185 |
| 4,241,412 A | * | 12/1980 | Swain | 342/185 |
| 4,245,250 A | * | 1/1981 | Tiemann | 348/442 |
| 4,275,415 A | * | 6/1981 | Engle | 348/442 |
| 4,310,907 A | * | 1/1982 | Tachita et al. | 342/185 |

(Continued)

FOREIGN PATENT DOCUMENTS

JP 9-297530 A 11/1997
JP 3696502 B2 7/2005

*Primary Examiner* — Bernarr Gregory
(74) *Attorney, Agent, or Firm* — Birch, Stewart, Kolasch & Birch, LLP (57) ABSTRACT

A radar device includes an antenna for acquiring data, an image memory including pixel data groups each arranged in a rectangular coordinate system, for converting the acquired data in a polar coordinate system into pixel data in the rectangular coordinate system and storing the pixel data, a data write module for writing the pixel data in the memory such that, when image data is stored in a display mode, pixel blocks each including M×N pixel data are arranged on the same line in the memory, a scanning direction setting module for setting a raster-scan direction, and a data reading module for reading out the image data by reading out the pixel data arranged on the same line in the image memory according to the raster-scan direction.

10 Claims, 11 Drawing Sheets

U.S. PATENT DOCUMENTS

| | | | | |
|---|---|---|---|---|
| 4,387,365 A * | 6/1983 | Berry et al. | | 342/185 |
| 4,412,220 A * | 10/1983 | Aanstoot et al. | | 342/185 |
| 4,415,928 A * | 11/1983 | Strolle et al. | | 348/442 |
| 4,434,422 A * | 2/1984 | Kenol et al. | | 342/185 |
| 4,434,437 A * | 2/1984 | Strolle et al. | | 348/442 |
| 4,443,797 A * | 4/1984 | Cramp et al. | | 342/185 |
| 4,547,803 A * | 10/1985 | Richards | | 348/442 |
| 4,580,164 A * | 4/1986 | Andrieu et al. | | 348/442 |
| 4,618,887 A * | 10/1986 | Birk | | 348/442 |
| 4,660,043 A * | 4/1987 | Lachaize et al. | | 342/185 |
| 4,675,679 A * | 6/1987 | Onozawa | | 342/185 |
| 4,697,185 A * | 9/1987 | Thomas et al. | | 342/185 |
| 4,754,279 A * | 6/1988 | Cribbs | | 342/185 |
| 4,829,308 A * | 5/1989 | Tol et al. | | 342/185 |
| 4,845,501 A * | 7/1989 | Pease et al. | | 342/185 |
| 4,931,801 A * | 6/1990 | Hancock | | 342/185 |
| 5,357,258 A * | 10/1994 | May | | 342/185 |
| 5,414,429 A * | 5/1995 | Giraudy | | 342/185 |
| 5,519,401 A * | 5/1996 | Farmer et al. | | 342/185 |
| 5,530,450 A * | 6/1996 | Sohn et al. | | 342/185 |
| 5,867,121 A * | 2/1999 | Erickson et al. | | 342/185 |
| 6,043,775 A * | 3/2000 | Erickson et al. | | 342/185 |
| 6,198,429 B1 * | 3/2001 | Fujikawa et al. | | 342/176 |
| 6,211,814 B1 * | 4/2001 | Benjamin et al. | | 342/185 |
| 6,342,852 B1 * | 1/2002 | Liu et al. | | 342/176 |
| 7,268,725 B2 * | 9/2007 | Makkapati et al. | | 342/185 |
| 7,327,309 B2 * | 2/2008 | Wimmer | | 342/185 |

* cited by examiner

RADAR DEVICE AND RADAR DEVICE COMPONENT

CROSS-REFERENCE TO RELATED APPLICATION(S)

This application claims priority under 35 U.S.C. §119 to Japanese Patent Application No. 2008-259040, which was filed on Oct. 3, 2008, the entire disclosure of which is hereby incorporated by reference.

TECHNICAL FIELD

The present invention relates to a radar device that converts reception data in a polar coordinate system into pixel data in a rectangular coordinate system and displays the converted data, and the present invention also relates to a radar device component including substantial elements of the radar device. More particularly, it is related to the radar device and the radar device component provided with two or more display modes.

BACKGROUND

Conventionally, radar devices, which detect target objects in all directions around a ship concerned, acquire signals (i.e., received signals) in a polar coordinate system while rotating a radar antenna at a predetermined speed (cycle). The radar device converts the received signal in the polar coordinate system into the pixel data in the rectangular coordinate system to write them in an image memory, and reads out each pixel data stored in the image memory at a predetermined timing. For this, an SDRAM is typically used for the image memory. A display has display dot groups arranged two-dimensionally, and it displays the pixel data while carrying out raster scans at a predetermined frequency (for example, 60 Hz).

Figure 7A:
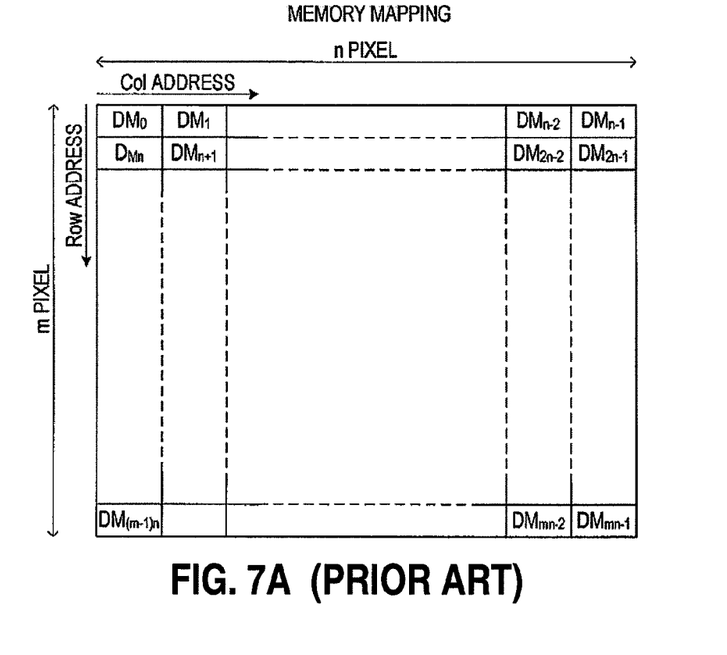
FIGS. 7A and 7B are views showing a relation between pixel addresses DM of a conventional general image memory and dot addresses DD of a display.
Figure 7B:
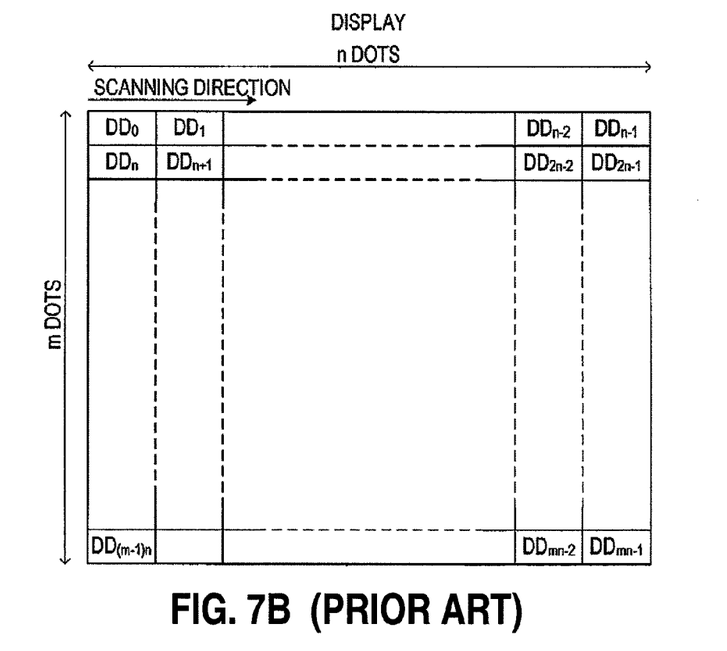

FIGS. 7A and 7B are views showing a relation between pixel addresses DM of the conventional general image memory, and dot addresses DD of the display, where FIG. 7A shows the pixel addresses DM of the image memory, and FIG. 7B shows the dot addresses DM of the display.

As shown in FIGS. 7A and 7B, the conventional radar device is set such that a Col direction (column direction) of the image memory as an SDRAM and a raster-scan direction of the dot matrix of the display are in agreement. This is because the SDRAM data can read out data at a higher speed in the Col direction than in the row direction, and thereby it can keep up with the speed of the raster scan of the display.

Meanwhile, in the recent radar devices, plural modes in which their display styles are different from each other can be set for the ship concerned or target objects other than the ship, etc. For example, the following display modes can be selected: a display mode in which north is set as a reference direction and the reference direction is set to be upward in the display image (hereinafter, referred to as a "North-Up Mode"); a display mode in which the bow direction of the ship is set to be upward in the display image (hereinafter, referred to as a "Head-Up Mode"); and a display mode in which a predetermined azimuth, such as an azimuth to a destination or a bow azimuth at the time of setting the display mode, is set to be upward (hereinafter, referred to as a "Course-Up Mode"). In addition, the following modes can be selected: a mode in which a position of the ship is fixed at the center in the display image (hereinafter, referred to as a "Relative Motion"); and a mode in which the ship position is moved in the display image corresponding to the movement of the ship (hereinafter, referred to as a "True Motion").

However, it may be necessary to change the display image corresponding to the combination of these modes or the turning of the ship. For this reason, disadvantages may arise when an angular difference is produced between the Col direction of the image memory and the raster-scan direction of the display, and the angular difference changes due to the turning of the ship.

Figure 8A:
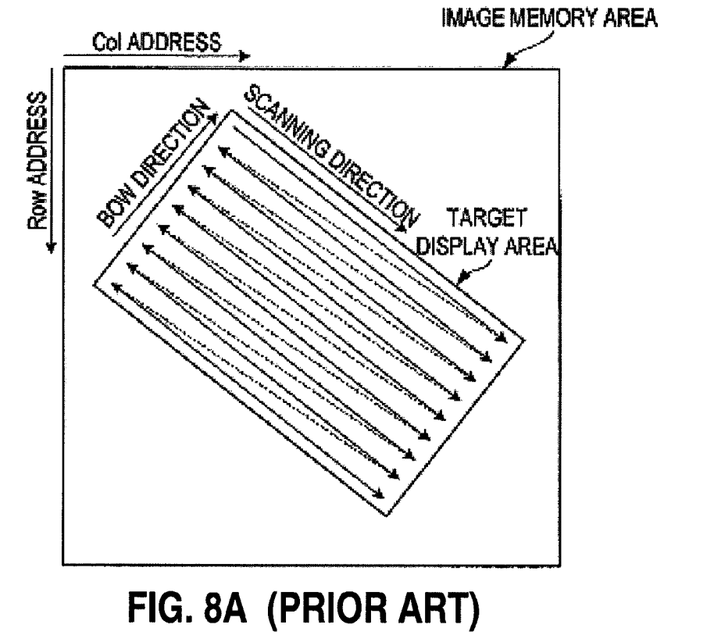
FIGS. 8A and 8B are views for illustrating disadvantages of a conventional display mode.
Figure 8B:
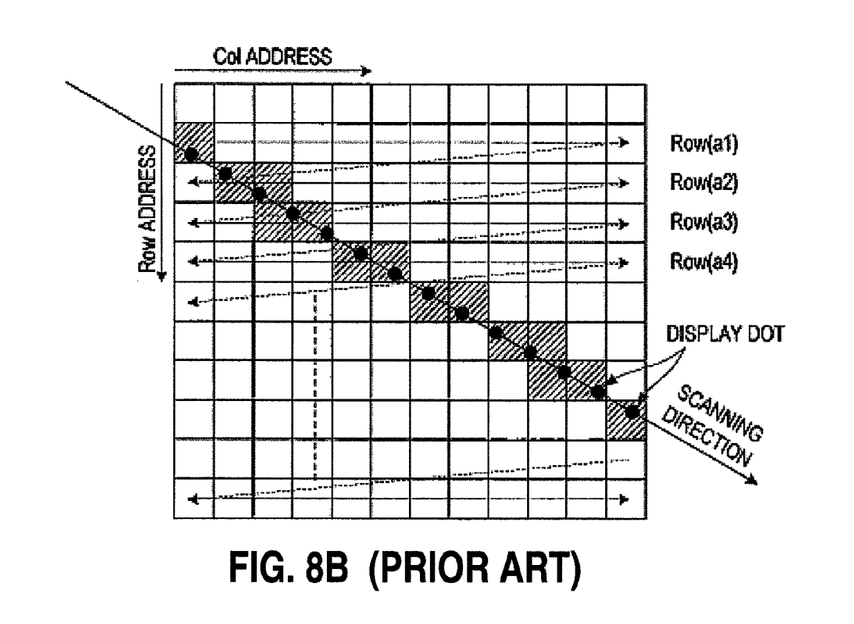

FIGS. 8A and 8B are views for illustrating the disadvantages of the conventional display modes, where FIG. 8A is a view showing a relation between the Col direction of the image memory and the raster-scan direction of the display when these directions have a predetermined angle therebetween, and FIG. 8B is an enlarged view of the image memory for illustrating a method of reading out from the image memory. In FIG. 8B, black dots schematically show dots of the display, respectively.

As shown in FIGS. 8A and 8B, when the Col direction of the image memory differs from the scanning direction of the display, if data is intended to be read out along the raster-scan direction of the display, the pixel data must be read out across two or more lines (rows). Here, for the SDRAM, although the data can typically be read out at a high speed in the Col direction, they cannot be read out at a high speed in the Row direction. For this reason, it will be difficult to keep up the read-out speed of the pixel data with the transfer rate of the image required for image rendering by the raster scan.

Therefore, in the conventional radar device, it is necessary to coincide the Col direction and the raster-scan direction, and until the antenna makes one revolution to write new pixel data in the image memory, the pixel data written in the last time are read out as pixel data at the same position in the display as they are to display them. For this reason, when displaying a radar image in the Head-Up Mode, even if the bow direction of the ship is changed, until the antenna would make one revolution and all the pixel data of the image memory would be updated, the correct radar image corresponding to the bow direction of the ship cannot be displayed and, thus, the display image cannot smoothly follow the turning of the ship.

As a method of solving the disadvantage, JP3696502(B) discloses the following radar device. As shown in FIG. 2 of JP3696502(B), this radar device sets division blocks each including a predetermined number of pixels arranged two-dimensionally in the image memory, reads out pixel data for each block according to the timing of display, and then stores the data in the SRAM. Then, according to an angular difference in the Col direction of the image memory and the scanning direction of the display, the radar device reads out from the SRAM the necessary pixel data among the pixel data temporary stored in the SRAM to the display them.

However, in the method disclosed in JP3696502(B), the SRAM has to be provided in addition to the SDRAM which is normally used as the image memory. Therefore, the constituent components for the device will increase in number and its cost will thus increase. In addition, when reading out, the following two procedures must be performed: (1) a batch transmission from the SDRAM to the SRAM, and (2) a read-out from the SRAM corresponding to the display modes. Further, when reading out from the SDRAM of (1), pixel data of two or more rows of the image memory must be read simultaneously. For example, two or more SDRAMs must be arranged in parallel for each row, and processing such as reading out simultaneously from two or more SDRAMs must be performed. Therefore, it will increase the cost significantly.

SUMMARY

In view of such conditions, the present invention provides a simply-configured radar device and radar device component that can promptly display an exact image corresponding to situations, such as selected display styles, and turning and/or moving situation of a ship concerned, without performing complicated processing.

According to an aspect of the invention, a radar device includes an antenna for acquiring reception data, an image memory for storing pixel data in the rectangular coordinate system which is converted from reception data in a polar coordinate system, a data write module for writing the pixel data in the image memory such that, when image data is stored in a predetermined display mode, pixel blocks each including M.times.N pixel data of M pixel data (M is two or greater natural number) on one axis in the rectangular coordinate system and N pixel data (N is two or greater natural number) on the other axis of the coordinates are arranged on the same line in the image memory, a scanning direction setting module for setting a raster-scan direction, and a data reading module for reading out the image data by reading out the pixel data arranged on the same line in the image memory according to the raster-scan direction.

In a display mode in which a reference direction in the display for the image data for display changes corresponding to a bow direction of a ship concerned, the scanning direction setting module may set the raster-scan direction to follow the change in the bow direction.

The radar device may further include a motion setting module for setting behavior of a position of a ship concerned in the display. The data reading module may read out the pixel data that constitutes the image data for display based on the behavior of the ship position and a read-out area of the raster scan that is set corresponding to the change in the ship position.

According to an aspect of the invention, a radar device component including an image memory for storing pixel data in the rectangular coordinate system which is converted from reception data in a polar coordinate system, a data write module for writing the pixel data in the image memory such that, when image data is stored in a predetermined display mode, pixel blocks each including M.times.N pixel data of M pixel data (M is two or greater natural number) on one axis in the rectangular coordinate system and N pixel data (N is two or greater natural number) on the other axis of the coordinates are arranged on the same line in the image memory, a scanning direction setting module for setting a raster-scan direction, and a data reading module for reading out the image data by reading out the pixel data arranged on the same line in the image memory according to the raster-scan direction.

In a display mode in which a reference direction in the display for the image data for display changes corresponding to a bow direction of a ship concerned, the scanning direction setting module may set the raster-scan direction to follow the change in the bow direction.

The radar device component may further include a motion setting module for setting behavior of a position of a ship concerned in the display. The data reading module may read out the pixel data that constitutes the image data for display based on the behavior of the ship position and a read-out area of the raster scan that is set corresponding to the change in the ship position.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, a radar device according to an embodiment of the present invention is explained with reference to the appended drawings. In this embodiment, although the radar device will be explained as an example application of the invention, this embodiment can be similarly applied to other devices, such as sonar, as long as they are to detect and display a target object.

Figure 1:
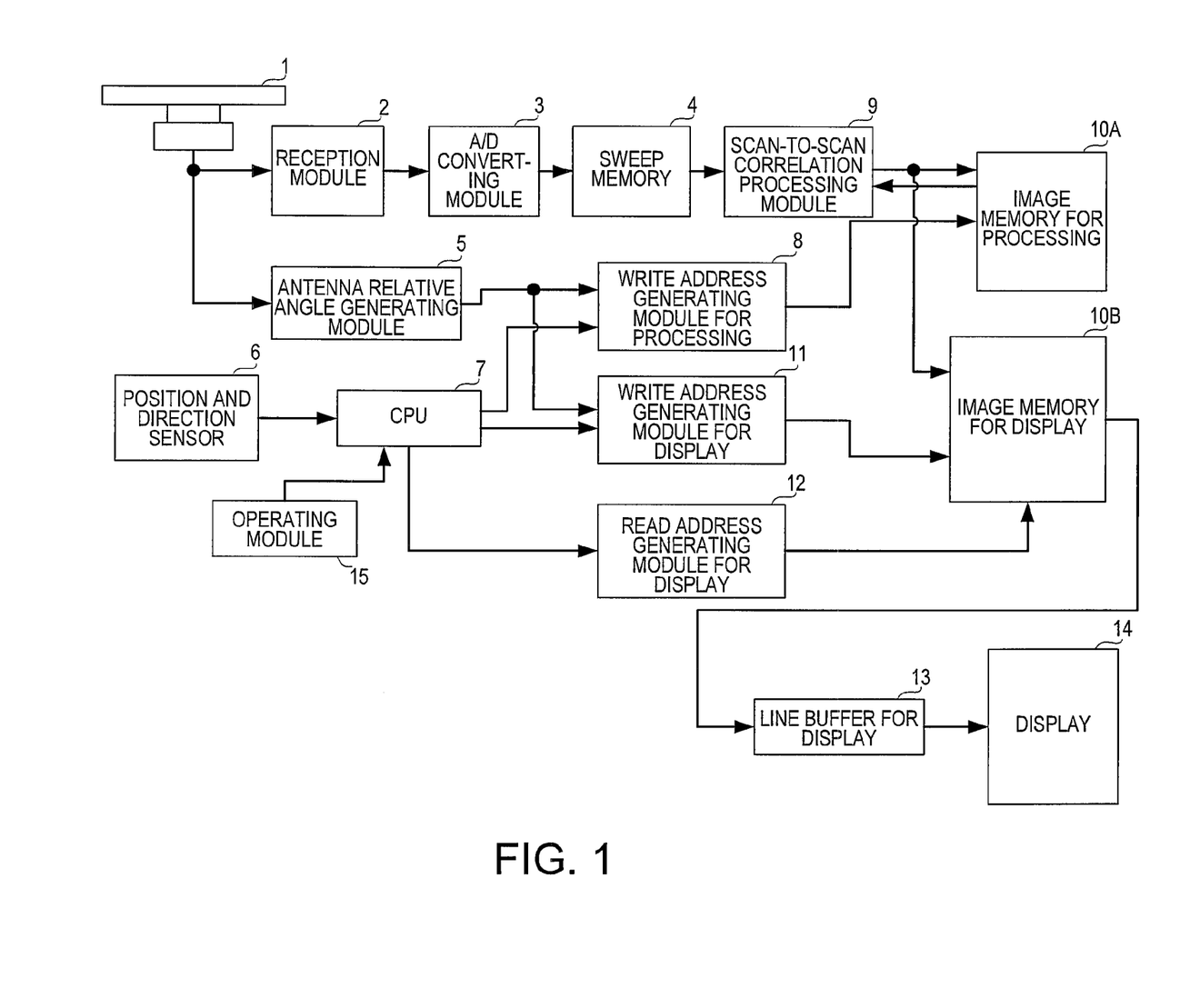
FIG. 1 is a block diagram showing a substantial configuration of a radar device according to an embodiment of the present invention.

FIG. 1 is a block diagram showing a substantial configuration of the radar device of this embodiment. In FIG. 1, a radar antenna 1 rotates typically along a horizontal surface at a predetermined rotation speed (cycle) while radiating pulse-shaped electric waves at a transceiving cycle different from the rotation cycle, and receives reflective waves from target object(s) around the device as data in a polar coordinate system. The radar antenna 1 outputs the received signal to a reception module 2, and outputs a sweep angle data to an antenna relative angle generating module 5.

The reception module 2 detects and amplifies the received signals from the radar antenna 1, and then outputs them to an A/D converting module 3. The A/D converting module 3 converts the analog received signals into digital data (echo data) including two or more bits.

A sweep memory 4 stores the digitally-converted echo data for one sweep in actual time. The sweep memory 4 outputs the echo data for one sweep to a scan-to-scan correlation processing module 9 by the time the echo data again obtained from the next transmission is written.

The antenna relative angle generating module 5 outputs an antenna angle θ with respect to a predetermined direction from the center of sweep rotation (for example, a bow direction of a ship concerned) to a write address generating module 8 for processing and a write address generating module 11 for display.

A position and direction sensor 6 includes a GPS positioning device, and detects positional data of the ship (ship position data) which indicates a current position of the ship and bow direction data which indicates the bow direction of the ship to output them to a CPU 7. The CPU 7 outputs the ship position data and the bow direction data to the write address generating module 8 for processing and the write address generating module 11 for display. The CPU 7 sets a display style from variety of display modes (North-Up Mode, Head-Up Mode, Course-Up Mode, etc.) and variety of motion settings (True Motion, Relative Motion, etc.) which are selected by an operator through an operating module 15, and then creates display style data.

The CPU 7 sets a display area (corresponding to a "read-out area of raster scan" in the claims) based on the ship position data, the bow direction data, and the display style data. The CPU 7 then outputs a start address and an end address for reading out the display area concerned ("read-out start address for display" and "read-out end address for display," respectively) and the raster-scan direction to a read address generating module 12 for display. Thus, the CPU 7 has a function of a "scanning direction setting module" in the claims.

The write address generating module 8 for processing sets the north direction to a reference direction (North-UP) like the North-Up Mode, for example. The write address generating module 8 for processing generates write addresses for an image memory 10A for processing in which pixels are mapped in the rectangular coordinate system where the center of sweep rotation changes with movement of the ship (True Motion). The write address generating module 8 for processing generates the write address for the image memory 10A for processing based on the antenna angle θ from the antenna relative angle generating module 5, a read-out position r from the sweep memory 4 for a single sweep with respect to the center of sweep rotation, and the ship position data and the bow direction data from the CPU 7.

The image memory 10A for processing is a storage medium in which scan-to-scan correlation data is stored, which is used for scan-to-scan correlation processing that suppresses echo data appearing at random for every antenna rotation, such as received signals due to the water surface reflection, and noises. The image memory 10A for processing includes an SDRAM into which pixels are mapped two-dimensionally and is set with addresses in the rectangular coordinate system described above.

The scan-to-scan correlation processing module 9 reads out the scan-to-scan correlation data for two or more scans of the past at positions in the image memory 10A for processing corresponding to the current echo data while synchronizing with the echo data being inputted from the sweep memory 4 and being converted from the polar coordinate system into the rectangular coordinate system, and then performs the scan-to-scan correlation processing. The scan-to-scan correlation processing module 9 updates the current scan-to-scan correlation data with the corresponding pixel addresses to the image memory 10A for processing to write them in the image memory 10A, and outputs them to an image memory 10B for display.

Figure 3:
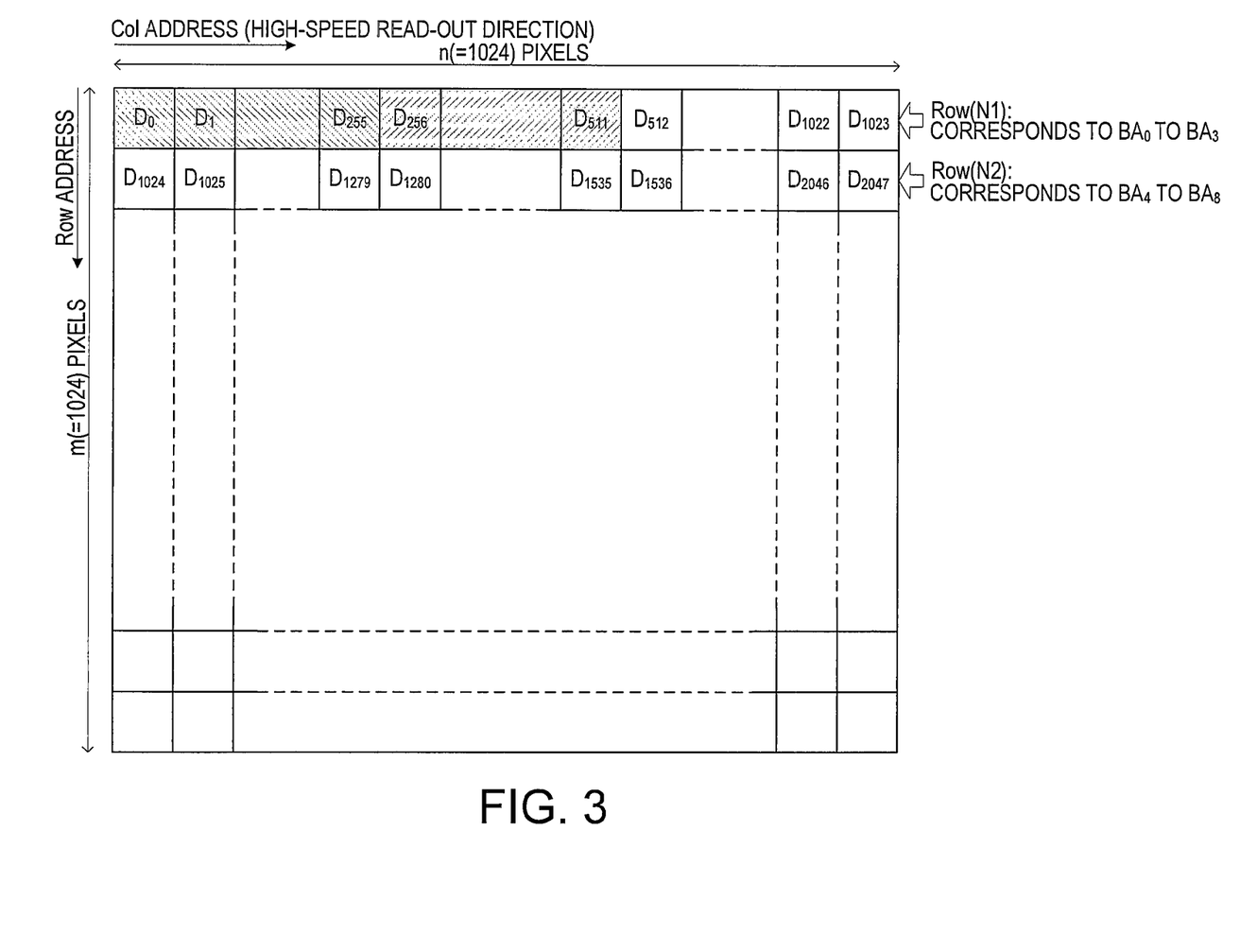
FIG. 3 shows a memory map of the image memory for display utilizing the concept shown in FIGS. 2A and 2B.

The write address generating module 11 for display generates write addresses to the image memory 10B for display having memory mapping shown in FIG. 3. The write address generating module 11 for display assumes a rectangular coordinate system for the North-Up Mode/True Motion similar to the image memory 10A for processing. The write address generating module 11 then calculates pixel addresses in the rectangular coordinate system based on the antenna angle θ from the antenna relative angle generating module 5, the read-out positions r in the sweep memory 4 for a single sweep, and the ship position data and the bow direction data from the CPU 7. Further, the write address generating module 11 performs a specific address conversion process shown below to generate the write addresses of the image memory 10B for display.

The image memory 10B for display includes an SDRAM. The image memory 10B is set with an address of each pixel by the memory mapping shown in FIG. 3, and stores the pixel data for every pixel.

Figure 2A:
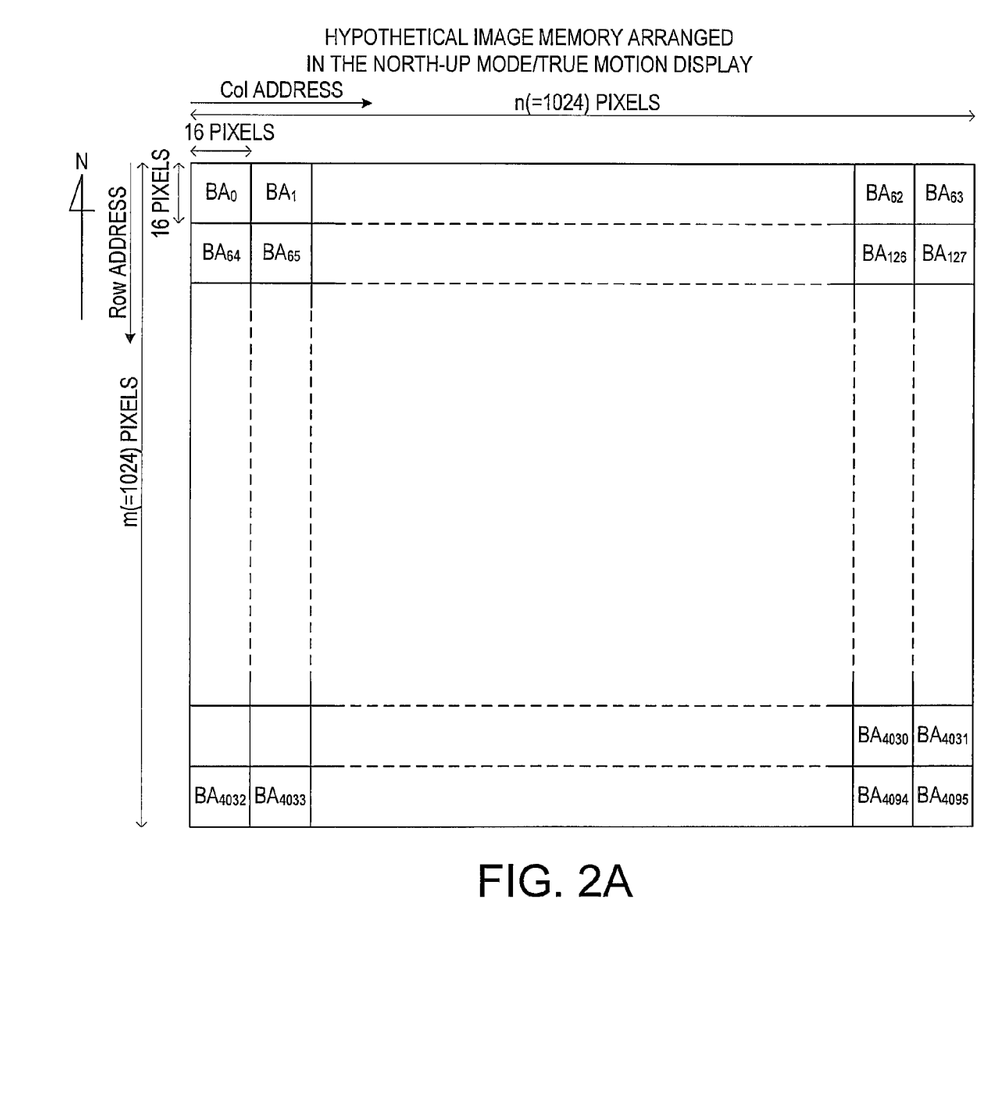
FIGS. 2A and 2B are views for illustrating a concept of address setting in an image memory for display.
Figure 2B:
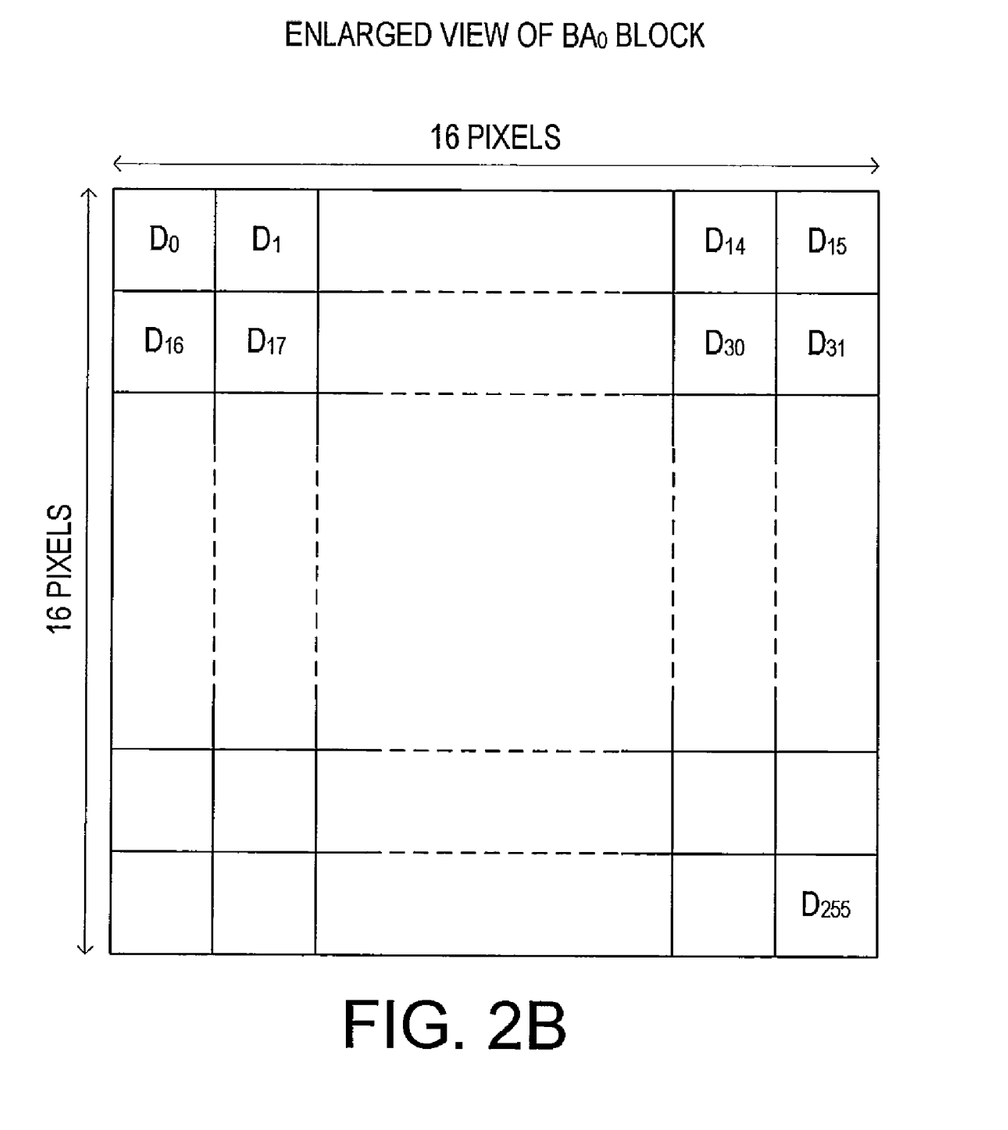

Here, the address setting method of the image memory 10B for display is explained with reference to FIGS. 2A and 2B and FIG. 3. FIGS. 2A and 2B are views for illustrating the concept of the address setting in the image memory 10B for display. Particularly, FIG. 2A shows the arrangement concept of pixel blocks BA in which the entire hypothetical image memory in the North-Up Mode set in a coordinate system for a hypothetical image memory for the address setting is divided into the blocks. Further, FIG. 2B shows the arrangement concept of pixels constituting each pixel block. FIG. 3 is a view showing memory mapping of the image memory 10B for display utilizing the concept shown in FIGS. 2A and 2B.

Note that, below, the case where the image memory 10B for display is constituted with pixels having 1024 pixels in the Col direction which is one axis direction in the rectangular coordinate system and 1024 pixels in the Row direction which is the other axis direction is explained.

First, the image memory as shown in FIG. 2A having [1024 pixels in the Col direction]×[1024 pixels in the Row direction] is set as the hypothetical image memory having a pixel arrangement similar to the image memory 10A for processing. Here, because it is in the North-Up Mode if it is the example of FIG. 2A, the north-south direction is set in the row direction. Addresses are set such that the start address of the entire hypothetical image memory is assigned to the north-westernmost pixel.

Next, the entire hypothetical image memory area is divided into the pixel blocks BA having [16 pixels in the Col direction]×[16 pixels in the Row direction]. Thereby, in the hypothetical image memory, the pixel blocks BA each having [16 pixels]×[16 pixels] are set two-dimensionally in the Col direction and the Row direction. Here, the pixel block $BA_0$ including the pixel of the start address described above is assigned to the northwesternmost pixel block, and other pixel blocks $BA_1$ to $BA_{4095}$ are also set so as to be arranged two-dimensionally. More specifically, the pixel block $BA_0$ is arranged at the northwesternmost end including the start address, and the pixel blocks $BA_1$, $BA_2$, ..., and $BA_{63}$ are arranged in this order in the Col direction. Then, after reached the end of the hypothetical image memory in the Col direction, the assignment area is shifted in the Row direction, and the pixel blocks $BA_{64}$ to $BA_{127}$ will be similarly arranged in the Col direction. The arrangement of such a group of the pixel blocks BA is performed sequentially, and as shown in FIG. 2A, the pixel blocks up to the pixel block $BA_{4095}$ including the southeasternmost pixel (that is, the pixel of the end address of the hypothetical image memory opposite from the start address) are arranged sequentially.

Each pixel block BA includes 16 pixels×16 pixels as described above. In each pixel block BA, pixels are arranged such that the smallest address is assigned to the pixel at the northwesternmost end of the pixel block and the largest address is assigned to the pixel $D_{255}$ at the southeasternmost end. For example, if it is the pixel block $BA_0$ shown in FIG. 2B, the pixel at the northwesternmost end is set to the address $D_0$, and the addresses $D_1, D_2, \ldots,$ and $D_{15}$ are assigned in the Col direction. Next, the address setting is shifted by one in the Row direction, and the addresses $D_{16}$ to $D_{31}$ are assigned in the Col direction. Such an address setting is repeated, and the address $D_{255}$ is assigned to the pixel at the southeasternmost end of the pixel block $BA_0$. Next, although not illustrated, in the pixel block $BA_1$ adjacent to the pixel block $BA_0$ in the Col direction, the address $D_{256}$ is assigned to the pixel at the northwesternmost end of the pixel block $BA_1$, and the address $D_{511}$ is assigned to the pixel at the southeasternmost end of the pixel block $BA_1$. The address assignment of the pixels is similarly set for the rest of the pixel blocks BA. Thereby, each pixel block BA is set so as to store the pixel data of the two-dimensional area in the hypothetical image memory.

Contrary to such a hypothetical image memory that has the reference direction and is divided into the blocks, in the image memory 10B for display, pixel groups, each constitutes one pixel block BA, are arranged on the same Row address. Upon this, the pixel groups, each constitutes one pixel block BA, are arranged so that their addresses increase in the Col direction (in a higher-speed direction for read-out). For example, as particularly shown in FIG. 3, 256 pixels that constitute the pixel block $BA_0$ are arranged sequentially in the Col direction on the Row (N1) in order from the pixel of the address $D_0$ to the pixel of the address $D_{255}$. Similarly, 256 pixels that constitute the pixel block $BA_1$ are arranged in the Col direction on the same Row (N1) in order from the pixel of the address $D_{256}$ to the pixel of the address $D_{511}$ sequentially after the pixel group of the pixel block $BA_0$. Further, 256 pixels that constitute the pixel block $BA_2$ are arranged in the Col direction on the same Row (N1) in order from the pixel of the address $D_{512}$ to the pixel of the address $D_{767}$ sequentially after the pixel group of the pixel block $BA_1$. Such an arrangement is performed for all the pixel blocks $BA_0$ to $BA_{4095}$ As described above, the image memory 10B for display sets two or more pixel blocks into which the hypothetical image memory area in the rectangular coordinate system having the reference direction is divided, and performs the address mapping so that the two-dimensionally arranged pixel groups in each of the set pixel blocks are arranged in the same line from which the pixel data can be read out at a high speed to store them for each pixel.

Then, to the image memory 10B for display to which such an address mapping is performed, read-out addresses are given from the read address generating module 12 for display.

The read address generating module 12 for display sets a read-out start address for display and a read-out end address for display from the CPU 7 and the read-out addresses to the image memory 10B for display according to the raster-scan direction. This read-out processing is performed synchronizing with the refresh timing of the screen (not illustrated) of the display 14. That is, it is carried out synchronizing with the raster-scan speed (frequency) of the display 14 which is faster than the update write processing to the image memory 10B for display determined based on the revolving speed of the antenna.

Figure 4A:
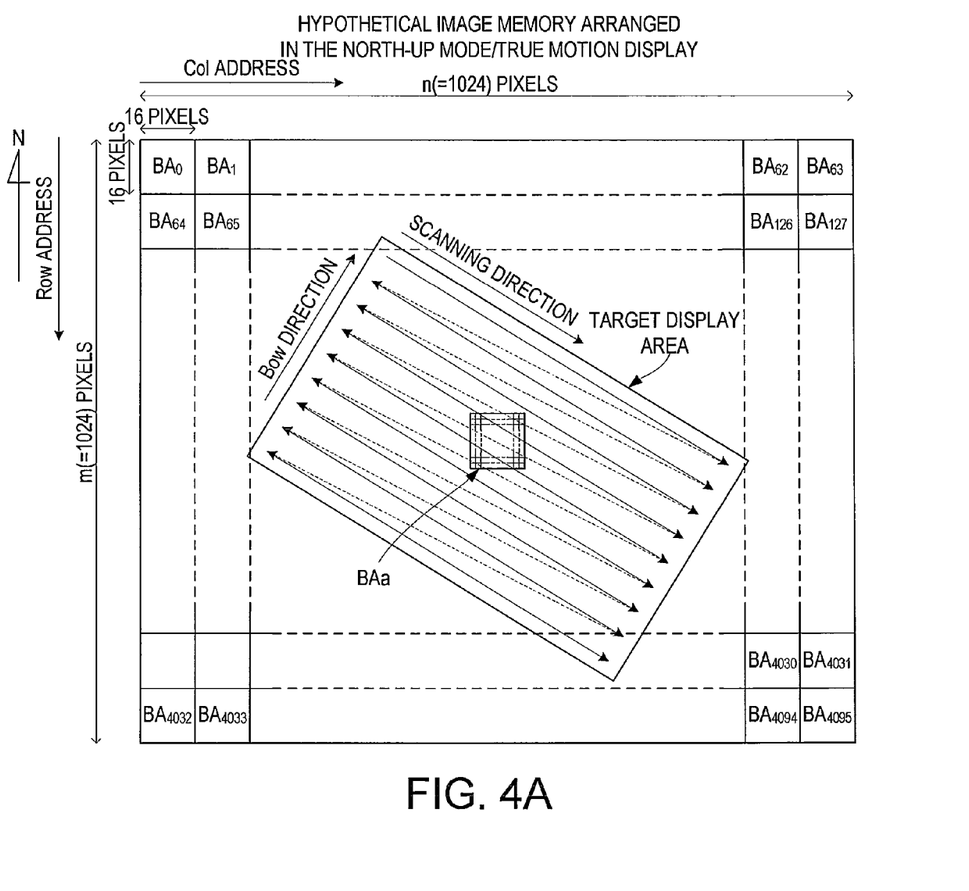
FIGS. 4A and 4B are views showing a determination method of a read-out address.
Figure 4B:
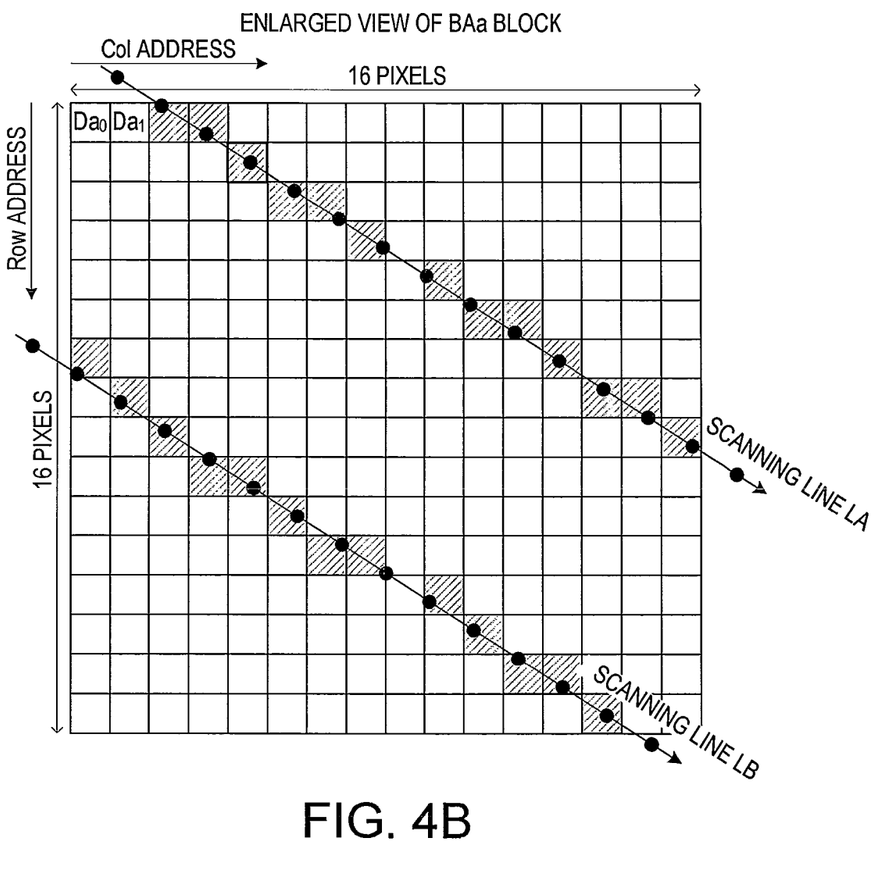
Figure 5:
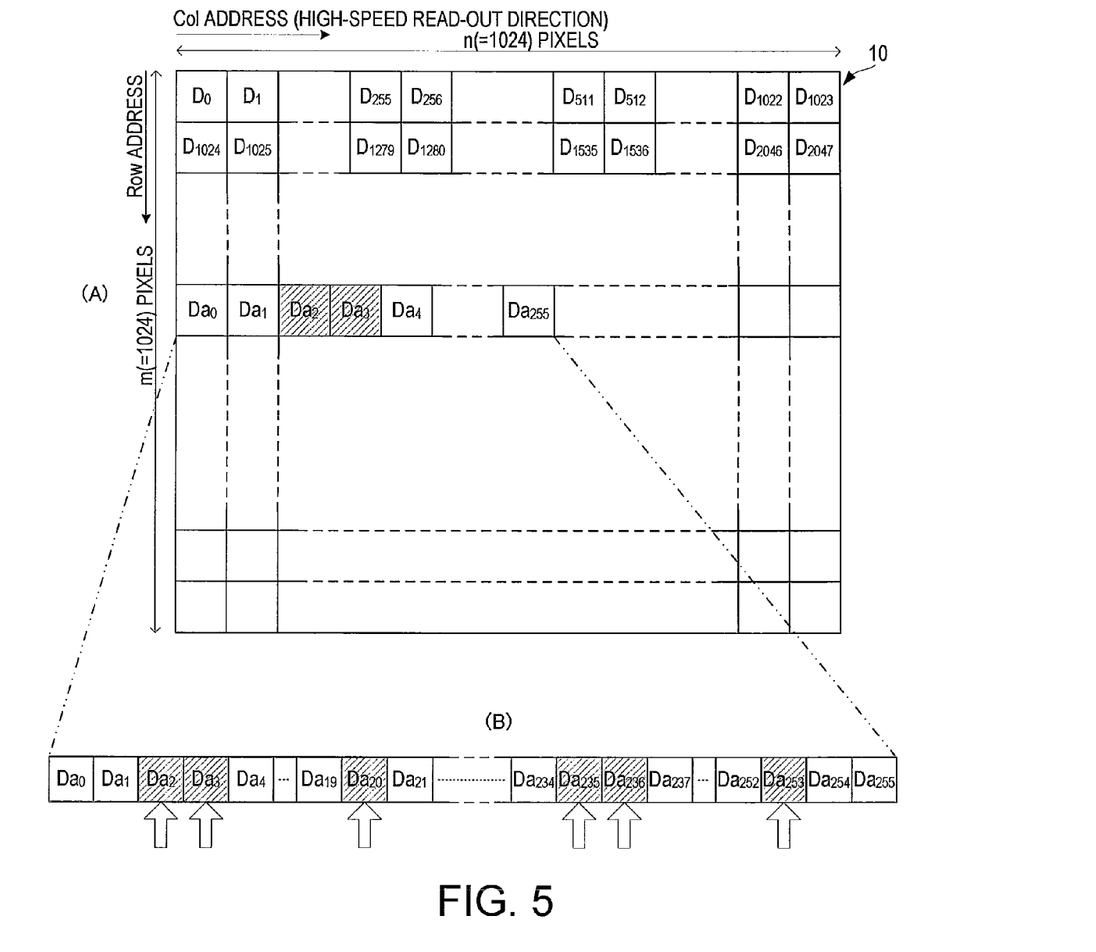
FIGS. 5 and 5B are views for illustrating a read-out method from the image memory for display.
Figure 5B:
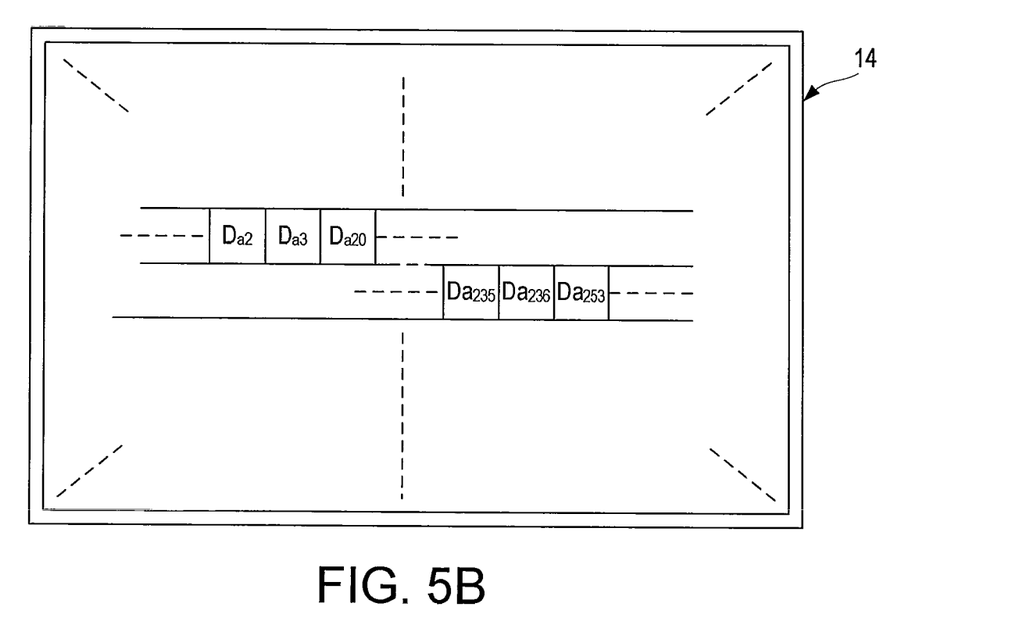

FIGS. 4A and 4B, and 5 and 5B are views for more particularly illustrating the setting method of the read-out addresses by the CPU 7 and the read address generating module 12 for display. FIGS. 4A and 4B are views showing a determination method of the read-out addresses, and FIGS. 5 and 5B are views for illustrating a read-out method from the image memory 10B for display.

The CPU 7 sets the raster-scan direction, the read-out start address for display, and the read-out end address for display of the display 14 in the hypothetical image memory based on the display style data (combination of the display mode and the motion setting), the ship position data, and the bow direction data. Specifically, the CPU 7 sets a pixel address, which is a conversion of a dot address of the upper left corner of the display screen into an address in the hypothetical image memory, to the read-out start address for display, and it sets the pixel address, which is a conversion of a dot address of the lower right corner of the display screen into an address on the hypothetical image memory, to the read-out end address for display. This sets a display area to the hypothetical image memory, where data are actually displayed on the display 14.

For example, FIGS. 4A and 4B show the case where the Head-Up Mode/True Motion is set, and in this case, the CPU 7 sets the center dot of the display 14 to the center address of the hypothetical image memory area. Because the bow direction data has been obtained, the CPU 7 then sets the raster-scan direction which has a predetermined angle with the Col direction in the hypothetical image memory area according to the bow direction, the read-out start address for display, and the read-out end address for display. These data are given from the CPU 7 to the read address generating module 12 for display. These data are sequentially determined by the CPU 7 according to the change in the ship position, the ship turning, and the setting change of the display mode or motion, and they are given to the read address generating module 12 for display.

The read address generating module 12 for display detects an overlap between each dot position of the display 14 and each pixel of the hypothetical image memory area based on the set raster-scan direction, the read-out start address for display, and the read-out end address for display, to acquire a pixel address of the overlapping position. Upon this, as shown in FIG. 4B, the read address generating module 12 for display performs this processing for every pixel block BA and for every scanning line.

For this processing, the case where scanning lines LA and LB cross the pixel block $BA_a$ set at a position as shown in FIGS. 4A and 4B is more particularly explained as an example. First, when the read address generating module 12 for display detects that the scanning line LA to be first read out intersects the area of the pixel block $BA_a$ based on the read-out start address for display, the read-out end address for display, and the raster-scan direction, it acquires each dot position (black dot shown in FIG. 4B) of the display 14 which exists on the scanning line LA, and sets as a target to be read out an address of the pixel overlapping the dot position (hatched pixels in FIG. 4B). The setting of the read-out address to such a scanning line LA is also performed sequentially for every pixel block which the scanning line LA intersects, even after the setting to the pixel block $BA_a$. After that, when the read address generating module 12 for display detects that the scanning line LB intersects the area of the pixel block $BA_a$, it sets addresses to be read out corresponding to dot positions on the scanning line LB, similar to the case of the scanning line LA.

The read address generating module 12 for display performs the setting processing of the addresses to be read out for every scanning line for all the dots of the display 14, determines the read-out addresses to the image memory 10B for display, and then gives them to the image memory 10B for display.

In the image memory 10B for display, pixel data are read out sequentially for every pixel block according to the read-out addresses received from the read address generating module 12 for display. Here, as described above, all the pixel data including the two-dimensional arrangement that constitute one pixel block BA are arranged on the same Row address. Therefore, by the single-time read-out processing, the pixel data two-dimensionally arranged in the hypothetical image memory in the rectangular coordinate system having the reference direction can be read out at a high speed. That is, when the Col direction differs from the raster-scan direction like the conventional example, even if two or more rows are not read out sequentially and continuously (refer to FIG. 8B), reading-out of the two-dimensionally arranged pixel data along the raster-scan direction included in one pixel block can be performed only by reading-out of one row which can be read out at a high speed (refer to FIGS. 5 and 5B). By this, if the technique of this embodiment in which one row is read out is used, the pixel data along the raster-scan direction can be read out at a higher speed than reading out the two or more rows sequentially.

The pixel data read in this way are outputted to a line buffer 13 for display. The line buffer 13 for display carries out buffer processing of the pixel data for every dot line (scanning line) of the display 14, and then outputs them to a display 14. The display 14 sets brightness or the like to the pixel data from the line buffer 13 for display according to a level of each pixel data, and then displays them on the display screen.

As described above, if the configuration of this embodiment is used, even if the raster-scan direction on the display is not in agreement with the high-speed read-out direction of the image memory set in the fixed rectangular coordinate system due to the various types of display modes, the movement or turning of the ship, or the like, an image can be displayed at a high speed corresponding to the current condition synchronizing with the refresh of the display image.

Note that, although the radar device that displays the current echo image is explained as an example, the configuration described above may be applied similarly to radar devices that display wakes (trail) behind a traveling ship.

Figure 6:
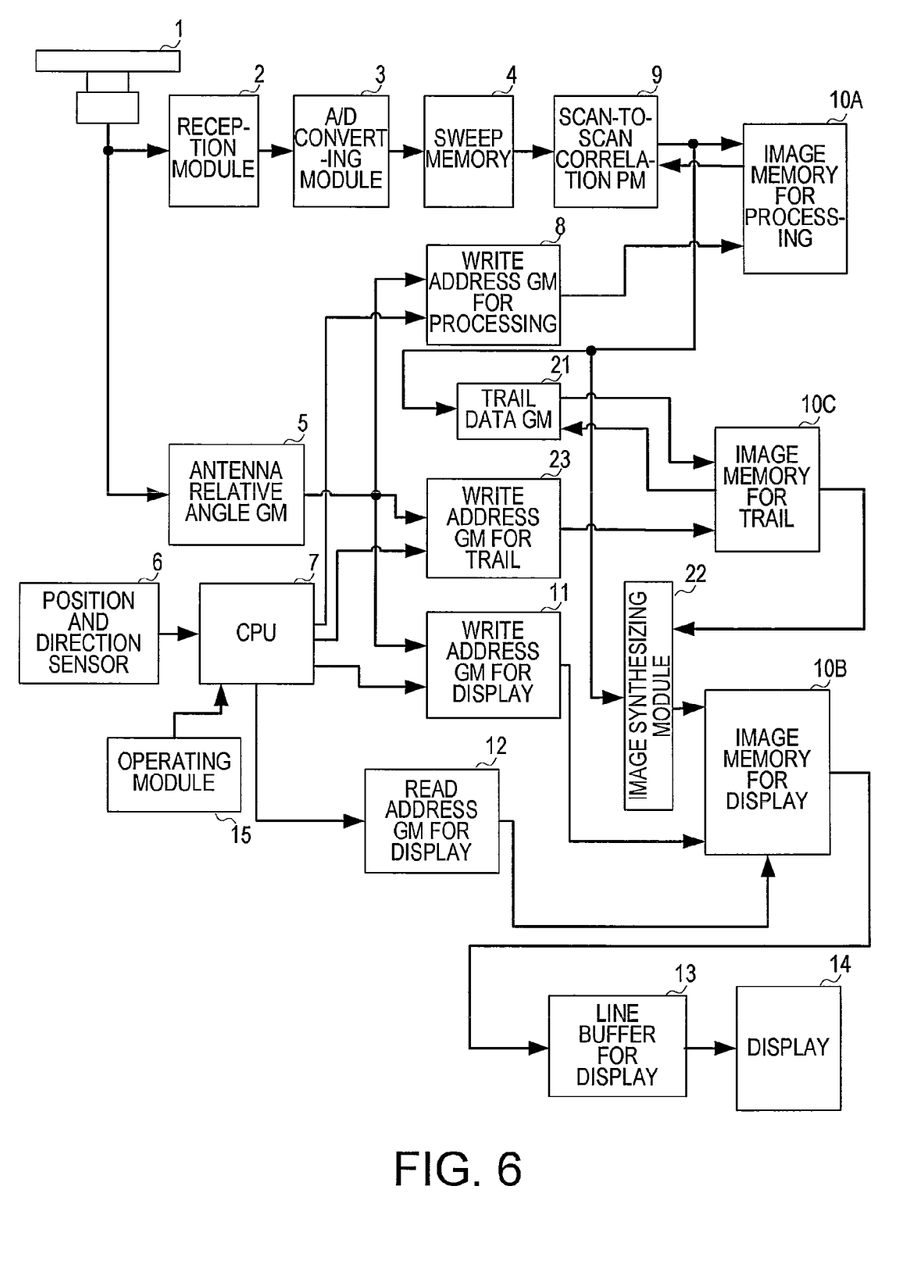
FIG. 6 is a block diagram showing a substantial configuration of a radar device according to another embodiment of the present invention.

FIG. 6 is a block diagram showing a configuration of another radar device that displays simultaneously the current echo image and the trail image.

As shown in FIG. 6, the radar device that simultaneously displays the current echo image and the trail image includes, in addition to the configuration of the radar device shown in FIG. 1, a trail data generating module 21, an image memory 10C for trail, an image synthesizing module 22, and a write address generating module 23 for trail. The trail data generating module 21 reads out the trail image data of one scan before, stored in the image memory 10C for trail, and then generates the current trail image data using current echo data after the scan-to-scan correlation processing and the trail image data of one scan before. The write address generating module 23 for trail generates write addresses to which the current trail image data generated by the trail data generating module 21 are updated at corresponding pixel addresses of the image memory 10C for trail. The image memory 10C for trail is an SDRAM as same as the image memory 10A for processing and has address mapping similar to the image memory 10A, and stores the image data for trail according to the write addresses from the write address generating module 23 for trail. The image synthesizing module 22 synthesizes the pixel data from the image memory 10A for processing having the same address mapping and the corresponding pixel data from the image memory 10C for trail, and then outputs them to the image memory 10B for display. The writing to the image memory 10B for display is performed according to the write addresses from the write address generating module 11 for display as described above. Then, the pixel data written in this way are read out by the read-out processing described above to be displayed.

Thereby, even if it is the radar device that displays the trail, the exact image display corresponding to the movement, turning, or the like of the ship can be performed quickly.

Although in the embodiments described above the example in which the image memory for processing and the image memory for display are provided independently, they may be integrated in a single image memory. That is, an image memory combining a function of the image memory for processing and a function of the image memory for display may be used. When using such a configuration, the pixel data are stored in the combined image memory using the write addresses for display similar to the image memory for display. Therefore, the scan-to-scan correlation processing module 9 performs the scan-to-scan correlation processing using the pixel data written by the write addresses for display.

Here, if there is a movement or turning of the ship, the read-out addresses for the scan-to-scan correlation processing must be changed. However, if a shift amount of the pixels in the hypothetic image memory including the fixed rectangular coordinate system or the change in the reference direction is set according to the detected condition of the movement or turning of the ship, the addresses in the hypothetical image memory of the pixel data corresponding to the current echo data can be determined and read out correctly. That is, additionally considering the shift amount of the pixels or the change in the reference direction, the pixel addresses corresponding to the current echo data in the hypothetical image memory are acquired, and the pixel data of the pixel addresses are given to the scan-to-scan correlation processing module 9. The scan-to-scan correlation processing module 9 performs the scan-to-scan correlation processing using the pixel data given in this way and the current echo data to update and store them in the combined image memory. By performing such processing, even if it is the configuration in which the pixel data of the pixel blocks in which the combined image memory is two-dimensionally arranged are arranged in one Row direction, the scan-to-scan correlation processing can be performed accurately without being influenced by the movement or turning situation of the ship, the display mode, and the motion setting. Further, if the raster-scan direction, the read-out start address for display, and the read-out end address for display are set to such a combined image memory, the exact image display can be performed quickly without being influenced by the movement or turning situation of the ship, the display mode, and the motion setting.

Although in the embodiments described above the number of pixels of each image memory is set to 1024×1024, the number of pixels of the image memory is not limited to this. Further, it is not necessary to limit to the number of pixels that constitute the pixel block, such as 16×16, and the number may be set arbitrary. In this case, the two-dimensional arrangement may not be limited to the square area but may be a rectangular area. That is, the number of pixels along one axis in the rectangular coordinate system may not be the same as the number of pixels along the other axis.

Further, the case where the coordinate of the image memory 10A for processing and the hypothetical image memory is set to the North-Up Mode/True Motion is shown. However, the display mode may be made an address setting in the rectangular coordinate system with respect to a fixed direction, without limited to the North-Up Mode. Further, the motion setting is not necessary to be set to the True Motion in order to display the direction of the image data for display following the change in the bow direction so as to rotate, and it may be any other motion setting.

Further, although in the embodiments described above the case where the display mode and the motion setting can be selected as an example, this configuration may be applied even if it is a device in which only either one can be selected.

Further, although in the embodiments described above the example which synchronizes with the timing of the raster scan of the display, this configuration may be applied if the writing to and the read-out from the image memory for display are separate and a high-speed read out is necessary.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "approximately" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A radar device, comprising:
    an antenna for acquiring reception data expressed in a polar coordinate system;
    an image memory for storing pixel data in a rectangular coordinate system;
    a data write module for calculating pixel addresses in the rectangular coordinate system based on the reception data, and for writing the pixel data in the image memory based on the calculated pixel addresses such that, when image data is stored in a predetermined display mode, pixel blocks each including M×N pixel data are arranged on the same line in the image memory;
    a scanning direction setting module for setting a raster-scan direction; and
    a data reading module for reading out the image data by reading out the pixel data arranged on the same line in the image memory according to the raster-scan direction, said read-out image data being provided to a display unit for display.

2. The radar device of claim 1, wherein, in a display mode in which a reference direction in the display unit changes corresponding to a bow direction of a ship equipped with said antenna, the scanning direction setting module sets the raster-scan direction to follow the change in the bow direction.

3. The radar device of claim 1, further comprising a motion setting module for setting behavior of a position of a ship equipped with said antenna in the display unit;
    wherein the data reading module reads out the pixel data that constitutes the image data for display based on the behavior of the ship position and a read-out area of the raster scan that is set corresponding to the change in the ship position.

4. A radar device component, comprising:
    an image memory for storing pixel data in a rectangular coordinate system which is converted from reception data in a polar coordinate system;
    a data write module for calculating pixel addresses in the rectangular coordinate system based on the reception data, said reception data being in the polar coordinate system, and for writing the pixel data in the image memory based on the calculated pixel addresses such that, when image data is stored in a predetermined display mode, pixel blocks each including M×N pixel data are arranged on the same line in the image memory;
    a scanning direction setting module for setting a raster-scan direction; and
    a data reading module for reading out the image data by reading out the pixel data arranged on the same line in the image memory according to the raster-scan direction, said read-out image data being provided to a display unit for display.

5. The radar device component of claim 4, wherein, in a display mode in which a reference direction in the display unit changes corresponding to a bow direction of a ship acquiring said reception data, the scanning direction setting module sets the raster-scan direction to follow the change in the bow direction.

6. The radar device component of claim 4, further comprising a motion setting module for setting behavior of a position of a ship acquiring said reception data in the display unit;
    wherein the data reading module reads out the pixel data that constitutes the image data for display based on the behavior of the ship position and a read-out area of the raster scan that is set corresponding to the change in the ship position.

7. A target detection device component, comprising:
    an image memory for storing pixel data in a rectangular coordinate system which is converted from target detection reception data in a polar coordinate system;
    a data write module for calculating pixel addresses in the rectangular coordinate system based on the target detection reception data, said target detection reception data being in the polar coordinate system, and for writing the pixel data in the image memory based on the calculated pixel address such that, when image data is stored in a predetermined display mode, pixel blocks each including M×N pixel data are arranged on the same line in the image memory;
    a scanning direction setting module for setting a raster-scan direction; and
    a data reading module for reading out the image data by reading out the pixel data arranged on the same line in the image memory according to the raster-scan direction, said read-out image data being provided to a display unit for display.

8. A method of storing and reading target detection data, comprising:

storing pixel data in a rectangular coordinate system which is converted from target detection reception data in a polar coordinate system;

calculating pixel addresses in the rectangular coordinate system based on the target detection reception data, said target detection reception data being in the polar coordinate system;

writing the pixel data in the image memory based on the calculated pixel addresses such that, when image data is stored in a predetermined display mode, pixel blocks each including M×N pixel data are arranged on the same line in the image memory;

setting a raster-scan direction;

reading out the image data by reading out the pixel data arranged on the same line in the image memory according to the raster-scan direction; and providing the read-out image data to a display unit for display.

9. The method of claim 8, the method further comprising:
setting the raster-scan direction to follow a change in a bow direction of a ship acquiring said reception data upon a notification that a reference direction in the display unit has changed corresponding to the bow direction.

10. The method of claim 8, the method further comprising:
setting behavior of a position of a ship acquiring said reception data in the display unit; and reading out the pixel data that constitutes the image data for display based on the behavior of the ship position and a read-out area of the raster scan that is set corresponding to the change in the ship position.

\* \* \* \* \*